(12) United States Patent
Coupland et al.

(10) Patent No.: US 10,913,257 B2
(45) Date of Patent: Feb. 9, 2021

(54) COMPONENT PRODUCED BY ADDITIVE MANUFACTURING

(71) Applicant: Johnson Matthey Public Limited Company, London (GB)

(72) Inventors: Duncan Roy Coupland, Royston (GB); Jonathan Edgar, Billingham (GB); Nelson To, West Chester, PA (US)

(73) Assignee: Johnson Matthey Public Limited Company, London (GB)

(*) Notice: Subject to any disclaimer, the term of this patent is extended or adjusted under 35 U.S.C. 154(b) by 0 days.

(21) Appl. No.: 16/634,211

(22) PCT Filed: Aug. 1, 2018

(86) PCT No.: PCT/GB2018/052196
§ 371 (c)(1),
(2) Date: Jan. 27, 2020

(87) PCT Pub. No.: WO2019/025795
PCT Pub. Date: Feb. 7, 2019

(65) Prior Publication Data
US 2020/0207069 A1   Jul. 2, 2020

Related U.S. Application Data

(60) Provisional application No. 62/540,728, filed on Aug. 3, 2017.

(30) Foreign Application Priority Data

Nov. 22, 2017 (GB) .................................. 1719370.7

(51) Int. Cl.
*B33Y 10/00* (2015.01)
*B22F 3/105* (2006.01)
(Continued)

(52) U.S. Cl.
CPC ............ *B33Y 10/00* (2014.12); *B22F 3/1055* (2013.01); *B22F 2003/1057* (2013.01);
(Continued)

(58) Field of Classification Search
USPC ..................................................... 123/169 EL
See application file for complete search history.

(56) References Cited

U.S. PATENT DOCUMENTS 4,133,735 A * 1/1979 Afromowitz ...... G01N 27/3335
                                                          204/406
5,779,842 A    7/1998 Fawcett et al.
(Continued)

FOREIGN PATENT DOCUMENTS

EP    2 957 367 A1   12/2015
EP    3 216 545 A1    9/2017
(Continued)

OTHER PUBLICATIONS

First Search Report of the Intellectual Property Office of the United Kingdom for GB1719370.7 dated May 18, 2018.
(Continued)

*Primary Examiner* — Ashok Patel
(74) *Attorney, Agent, or Firm* — BakerHostetler (57) ABSTRACT

The present invention relates generally to components prepared by additive manufacturing (AM) methods, along with methods of preparing such components by AM. More especially, there is provided a process for the production of a component of an ignition device using an AM method by forming a layer of metal or alloy on a surface of a metal or alloy substrate; fusing the layer to the substrate; and repeating the addition of such layers upon one another to form a deposited metal or alloy attachment on the substrate.

16 Claims, 7 Drawing Sheets

(51) Int. Cl.
    *B33Y 80/00*   (2015.01)
    *B23K 26/342*  (2014.01)
    *H01T 13/39*   (2006.01)
    *H01T 21/02*   (2006.01)
    *B33Y 30/00*   (2015.01)

(52) U.S. Cl.
    CPC .............. *B23K 26/342* (2015.10); *B33Y 30/00* (2014.12); *B33Y 80/00* (2014.12); *H01T 13/39* (2013.01); *H01T 21/02* (2013.01)

(56) References Cited

U.S. PATENT DOCUMENTS

| | | | |
|---|---|---|---|
| 9,197,038 B1* | 11/2015 | Inoue | B23K 11/002 |
| 2006/0028106 A1 | 2/2006 | Lineton et al. | |
| 2012/0060468 A1 | 3/2012 | Dushku et al. | |
| 2012/0260492 A1 | 10/2012 | Bonnet et al. | |
| 2015/0360287 A1 | 12/2015 | Zink et al. | |
| 2016/0290302 A1 | 10/2016 | Shafer et al. | |
| 2017/0106593 A1 | 4/2017 | Khairallah | |
| 2017/0234268 A1 | 8/2017 | Summers et al. | |
| 2017/0252854 A1 | 9/2017 | Maier et al. | |

FOREIGN PATENT DOCUMENTS

| | | |
|---|---|---|
| JP | S62 88287 A | 4/1987 |
| WO | 2017117041 A1 | 7/2017 |
| WO | WO2017142590 A1 | 8/2017 |

OTHER PUBLICATIONS

Combined Search and Examination Report of the Intellectual Property Office of the United Kingdom for GB1719370.7 dated Jan. 22, 2019.

International Search Report of the International Searching Authority for PCT/GB2018/052196 dated Oct. 2, 2018.

* cited by examiner

COMPONENT PRODUCED BY ADDITIVE MANUFACTURING

TECHNICAL FIELD

The present invention relates generally to components prepared by additive manufacturing (AM) methods, along with methods of preparing such components by AM.

BACKGROUND ART

It is often necessary to attach a noble metal or noble metal-containing alloy to another metal or alloy to form an assembly. The other metal or alloy may also be noble metal-based or may be another type of metal or alloy. The noble metals consist of ruthenium (Ru), rhodium (Rh), palladium (Pd), silver (Ag), osmium (Os), iridium (Ir), platinum (Pt) and gold (Au).

The joining of a metal or alloy to another metal or alloy to form an assembly is also necessary when manufacturing ignition system devices, such as spark plugs. Such devices include components such as a central electrode which is usually connected to the ignition system, and a ground or side electrode which is grounded by connection to the metal shell of the ignition device. The tip of the ignition device component (for example, the tip of the central electrode or ground electrode), from which a spark is generated during use, often (but not always) consists of a noble metal or noble metal-containing alloy (for example a metal or alloy comprising gold, silver, ruthenium, rhodium, palladium, osmium, iridium or platinum). The reason for this is that the tip of the electrode must be able to withstand very harsh conditions of high temperature and high voltage during operation of the device and so must be made from more resilient and often more expensive material. The remainder of the electrodes, which do not experience such harsh conditions, are often formed from different, less expensive metal or alloy materials (for example Ni—Cr alloy and/or copper).

A common way to manufacture the electrode in such ignition system devices is to draw noble metal (for example, platinum group metals (PGM)) and base metal (typically Inconel, a Ni—Cr alloy) wires. These wires are then fed in such a way that the metals touch and a laser or friction weld is carried out. Once welded, the noble metal and base wire assembly is then cut on both sides, such that a welded small stub of material is formed. Typically, the base metal element of this stub is then itself welded onto the substrate to form the electrodes, after each substrate has been (separately) independently manufactured. Commonly used substrates for this purpose are based on Inconel, a Ni—Cr alloy, with a Cu core. Such substrates are pre-formed by the co-extrusion of the two metals and are well-known.

An alternative method currently used to manufacture the electrode in such devices is to laser-weld a piece or 'slug' of sectioned Pt wire onto the substrate to form the electrode tip, after each substrate has been independently manufactured.

Figure 1:
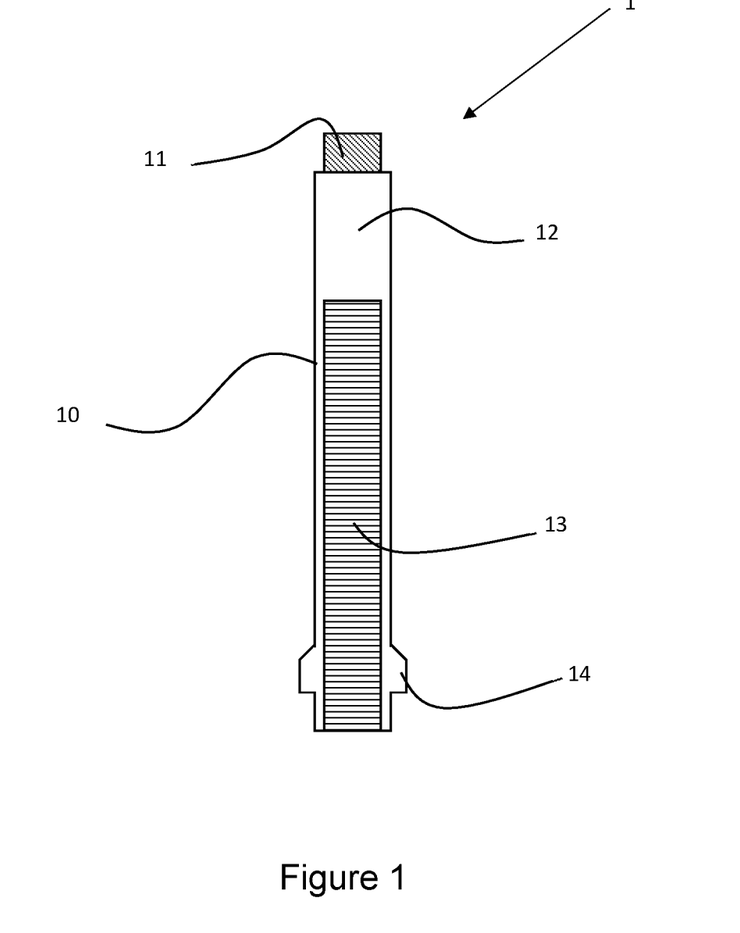
FIG. 1 is a schematic cross-sectional view of a prior art spark plug electrode.

A prior art ignition device component 1 is depicted in FIG. 1. The device, which is a spark plug electrode, is made up of a substrate 10 which has been laser welded to an electrode tip 11. The substrate 10 includes a copper core 13 and an Inconel outer portion 12. The component also includes an annular protrusion 14 which is commonly present on spark plug electrodes and ensures that the central electrode of the spark plug fits well within a recess in the ceramic housing, which has a complementary shape in order to receive the protrusion.

These existing manufacturing processes have some benefits in that the amount of expensive noble metal used is minimised relative to the use of an electrode which is entirely noble metal-based.

However, the processes are complex and expensive due to the need to prepare the metal wires in an upstream process, section them and perform the necessary welding steps, either to laser-weld each wire section onto a substrate to form the electrode tip or to friction weld the two wires. Cutting of wire results in kerf loss (the inevitable loss of material when a cutting tool passes through a wire during sectioning). If a shaped electrode tip (such as a tapered tip) is desired, the end of the slug must be shaped by machining, with inevitable further material loss. Existing processes also lack flexibility because a specific length of sectioned wire must be used in order to provide the desired corresponding length of electrode tip. As a result, it may be necessary to prepare and make available a wide variety of lengths of sectioned wire in a preliminary stage of the process, which is complex. The handling of slugs and other small portions of wire is difficult and results in further losses.

There is a need for simpler, more cost-effective processes for the manufacture of noble metal-containing components, and more specifically for the manufacture of components for ignition devices.

Any sub-titles herein are included for convenience only, and are not to be construed as limiting the disclosure in any way.

SUMMARY OF THE INVENTION

Accordingly, a first aspect of the invention is a process for the production of a component of an ignition device using an additive manufacturing method, comprising
(i) forming a layer of metal or alloy on a surface of a metal or alloy substrate;
(ii) fusing the layer to the substrate; and
(iii) repeating (i) and (ii) layer upon layer to form a deposited metal or alloy attachment on the substrate.

A second aspect of the invention is an ignition device component obtained or obtainable by a process according to the first aspect.

A third aspect of the invention is an ignition device comprising a component according to the second aspect.

A fourth aspect of the invention is an engine comprising an ignition device according to the third aspect.

A fifth aspect of the invention is the use of an ignition device component according to the second aspect in an ignition device, preferably as an electrode in an ignition device.

The inventors have found that an additive manufacturing method for the manufacture of ignition device components, such as electrodes for ignition devices, offers a very efficient means to produce the components with minimal wasted material. Additional time-consuming and loss-generating manufacturing processes for the preparation of sectioned wire and its subsequent attachment to a substrate are avoided. Moreover, the geometry of the deposited attachment is entirely customisable to suit the particular application, and a strong bond is formed between the substrate and the attachment.

More generally, the additive manufacturing method described herein may be used to form a noble metal-based attachment on a substrate. The noble metal-based attachment may comprise a noble metal or an alloy thereof. Thus, a sixth aspect of the invention is a process for the production of a noble metal-containing component using an additive manufacturing method, comprising:
(i) forming a layer of metal or alloy on a surface of a substrate, wherein the metal or alloy comprises a noble metal or alloy thereof, and wherein the substrate is a metal or alloy substrate;
(ii) fusing the layer to the substrate; and
(iii) repeating (i) and (ii) layer upon layer to form a deposited noble metal or noble metal alloy attachment on the substrate.

It will be understood that in this context 'noble metal' refers to the elements ruthenium (Ru), rhodium (Rh), palladium (Pd), silver (Ag), osmium (Os), iridium (Ir), platinum (Pt) and gold (Au).

DETAILED DESCRIPTION OF THE INVENTION

Layer of Metal or Alloy

According to the process of the invention, layers of metal or alloy are sequentially laid down onto a substrate to form an attachment on the substrate.

Suitably, layers of metal are sequentially laid down onto a substrate to form a metal attachment on the substrate.

Suitably, the metal laid down onto the substrate comprises or consists of one or more of Co, Al, Ni, W, Fe, Zn, Mn, Sc, Ti, V, Cr, Cu, Zr, Nb, Mo, Ru, Rh, Pd, Ag, Hf, Ta, Re, Os, Ir, Pt and Au. Preferably, the metal laid down onto the substrate comprises or consists of one or more of Ru, Rh, Pd, Ag, Os, Ir, Pt and Au. More preferably, the metal laid down onto the substrate comprises or consists of one or more of Ru, Rh, Pd, Ag, Ir, Pt and Au. Most preferably, the metal laid down onto the substrate comprises or consists of one or more of Ru, Rh, Pd, Ir and Pt.

In some, particularly preferred embodiments, the metal laid down onto the substrate comprises or consists of one or more of Ru and Ir.

Additionally, or alternatively, the metal laid down onto the substrate comprises or consists of two or more of Ru, Rh, Pd, Ag, Os, Ir, Au and Pt. Preferably, the metal laid down onto the substrate comprises or consists of two or more of Ru, Rh, Pd, Ag, Ir, Au and Pt. More preferably, the metal laid down onto the substrate comprises or consists of two or more of Ru, Rh, Pd, Ir, and Pt.

Additionally, or alternatively, layers of alloy are sequentially laid down onto a substrate to form an alloy attachment on the substrate.

Suitably, the alloy laid down onto the substrate comprises or consists of an alloy of one or more of Co, Al, Ni, W, Fe, Zn, Mn, Sc, Ti, V, Cr, Cu, Zr, Nb, Mo, Ru, Rh, Pd, Ag, Hf, Ta, Re, Os, Ir, Pt and Au with one or more other elements, for example one or more other metals. The one or more other elements in the alloy may also be selected from Co, Al, Ni, W, Fe, Zn, Mn, Sc, Ti, V, Cr, Cu, Zr, Nb, Mo, Ru, Rh, Pd, Ag, Hf, Ta, Re, Os, Ir, Pt and Au.

However, preferably, the alloy laid down onto the substrate comprises or consists of an alloy of one or more of Ru, Rh, Pd, Ag, Os, Ir, Pt and Au with one or more other elements, for example one or more other metals. Optionally and alternatively, the alloy laid down onto the substrate comprises or consists of an alloy of two or more of Ru, Rh, Pd, Ag, Os, Ir, Pt and Au. More preferably, the alloy laid down onto the substrate comprises or consists of an alloy of one or more of Ru, Rh, Pd, Ag, Ir, Pt and Au with one or more other elements, for example one or more other metals. Even more preferably, the alloy laid down onto the substrate comprises or consists of an alloy of one or more of Ru, Rh, Pd, Ir and Pt with one or more other elements, for example one or more other metals. Most preferably, the alloy laid down onto the substrate comprises or consists of an alloy of one or more of Ru and Ir with one or more other elements, for example one or more other metals, in this case it is particularly preferred that the alloy laid down onto the substrate comprises or consists of an alloy containing Ru or Ir as the primary component, with one or more other elements, for example one or more other metal.

It is particularly preferred that the metal or alloy deposited onto the substrate comprises a noble metal or alloy thereof. More preferably, the metal or alloy deposited onto the substrate comprises a PGM or alloy thereof.

Preferable features described in relation to a process for the production of a component of an ignition device (first aspect of the invention) apply equally to the process for the production of a noble metal-containing component (sixth aspect of the invention), with the proviso that the production of the noble metal-containing component is limited to a method comprising:
(i) forming a layer of metal or alloy on a surface of a substrate, wherein the metal or alloy comprises a noble metal or alloy comprises a noble metal alloy thereof, and wherein the substrate is a metal or alloy substrate;
(ii) fusing the layer to the substrate; and
(iii) repeating (i) and (ii) layer upon layer to form a deposited noble metal or noble metal alloy attachment on the substrate.

It will be understood that in this context 'noble metal' refers to the elements ruthenium (Ru), rhodium (Rh), palladium (Pd), silver (Ag), osmium (Os), iridium (Ir), platinum (Pt) and gold (Au).

Preferably, in the sixth aspect, the noble metal may be a platinum group metal (PGM), i.e. selected from the elements ruthenium (Ru), rhodium (Rh), palladium (Pd), osmium (Os), iridium (Ir) and platinum (Pt). Preferably, the noble metal is selected from the elements ruthenium (Ru), rhodium (Rh), palladium (Pd), iridium (Ir) and platinum (Pt).

The layers may be deposited in a variety of ways as discussed in more detail below. For example, in some embodiments, layers of metal or alloy powder are deposited into the substrate, and the powder in each layer is bound or fused together and to the substrate or layer below before a further layer is deposited. Such methods are generally known as "powder bed fusion" (PBF) techniques.

PBF methods are particularly preferred in the present invention as they offer a higher production rate than other AM techniques.

Alternatively, for example, the layers may be deposited in molten form followed by cooling and solidification of the deposited layer, and subsequent deposition of a further molten layer on top of the previous layer. Such methods include "directed energy deposition" (DED) techniques.

In other embodiments, layers are deposited as metal or alloy sheets, each of which is fused to adjacent layers. Adjacent layers may be joined by welding techniques or by the use of adhesive. Such methods include "sheet lamination" (SL) techniques.

In all embodiments of the invention, the first layer and by extension the attachment itself is "fused" to the substrate. In other words, a strong bond is formed between the substrate and the attachment such that the attachment cannot be easily removed from the substrate. This may be achieved, for example, by partial melting of both the first layer and a region of the substrate surface adjacent the first layer. The invention as described herein, can be contrasted with binder jet powder bed techniques, in which a binding agent is deposited in a layer wise fashion to hold the powder together, by the fact that no binder is present in the layer forming process. In binder jet powder bed techniques, a binding agent is incorporated into the produced green part, and is later removed via a debindering step to form a brown part which is then sintered and fused to achieve full density. In the processes of the present invention, each layer is fused in step ii) and no binder is necessarily present, and hence there is no need for the performance of a debindering step. As such, the present production processes provide a simpler manufacturing process over the use of binder jet powder bed techniques.

Metal or Alloy Powder

In some embodiments, step (i) of the method comprises forming a layer of metal or alloy powder on the surface of the metal or alloy substrate; and step (ii) comprises binding or fusing at least a portion of the powder in the layer both together and to the substrate.

The powder which is deposited during the AM process is a metal powder or an alloy powder.

The terms "metal powder" and "alloy powder" denote a powder which comprises metal or alloy particles respectively. Other particulate components such as binders, solvents, additives and inevitable impurities may also be present.

Suitably, the powder is a metal powder, i.e. a powder comprising metal particles. The metal powder comprises or consists of particles of one or more of Co, Al, Ni, W, Fe, Zn, Mn, Sc, Ti, V, Cr, Cu, Zr, Nb, Mo, Ru, Rh, Pd, Ag, Hf, Ta, Re, Os, Ir, Pt and Au. Preferably the metal powder may comprise or consist of noble metal particles, for example platinum group metal (PGM) particles. As such, preferably, the metal powder comprises or consists of particles of one or more of Ru, Rh, Pd, Ag, Os, Ir, Pt and Au. More preferably, the metal powder comprises or consists of particles of one or more of Ru, Rh, Pd, Ag, Ir, Pt and Au. Even more preferably, the metal powder comprises or consists of particles of one or more of Ru, Rh, Pd, Ir and Pt. Most preferably, the metal powder comprises or consists of particles of one or more of Ru and Ir.

Optionally, the metal powder may also comprise other, non-metallic particle components, such as ceramics, glasses and plastics.

Additionally, or alternatively, the powder is an alloy powder, i.e. a powder comprising particles of an alloy. Suitably, the alloy powder comprises or consists of particles of an alloy of one or more of Co, Al, Ni, W, Fe, Zn, Mn, Sc, Ti, V, Cr, Cu, Zr, Nb, Mo, Ru, Rh, Pd, Ag, Hf, Ta, Re, Os, Ir, Pt and Au with one or more other elements, for example one or more other metals. The one or more other elements in the alloy may also be selected from Co, Al, Ni, W, Fe, Zn, Mn, Sc, Ti, V, Cr, Cu, Zr, Nb, Mo, Ru, Rh, Pd, Ag, Hf, Ta, Re, Os, Ir, Pt and Au. Preferably, the alloy powder may comprise or consist of particles of noble metal alloy, for example particles of a platinum group metal (PGM) alloy, as such preferably the alloy powder comprises or consists of particles of an alloy of one or more of Ru, Rh, Pd, Ag, Os, Ir, Pt and Au with one or more other elements, for example one or more other metals. More preferably, the alloy powder comprises or consists of particles of an alloy of two or more of Ru, Rh, Pd, Ag, Os, Ir, Pt and Au. Yet more preferably, the alloy powder comprises or consists of particles of an alloy of one or more of Ru, Rh, Pd, Ag, Ir, Pt and Au with one or more other elements, for example one or more other metals. Even more preferably, the alloy powder comprises or consists of particles of an alloy of one or more of Ru, Rh, Pd, Ir and Pt with one or more other elements, for example one or more other metals. Most preferably, the alloy powder comprises or consists of particles of an alloy of one or more of Ru and Ir with one or more other elements, for example one or more other metals, and in this case, it is most preferable that the alloy powder comprises or consists of particles of an alloy containing Ru or Ir as the primary component, with one or more other elements, for example one or more other metals.

Optionally, the alloys may contain additional components selected from one or more of Y, Zr and Sm. Preferably, the alloys may contain Zr. Without wishing to be bound by theory, it is believed that the inclusion of these elements may ductilise the alloys. It is also believed that the inclusion of these elements (in particular Zr) may hinder the dislocation movement through grain boundaries (i.e. the boundaries between crystal lattices at different orientations) and hence limit or slow grain growth which is advantageous.

In addition to metal and/or alloy particles, the powder may further comprise auxiliary particles such as ceramics, binders and/or flow agents.

Additionally, or alternatively, the alloy powder comprises other, non-alloy components in addition to the alloy particles. For example, the alloy powder may also comprise ceramic oxide particles. Without wishing to be bound by theory, it is believed that the presence of such ceramic oxide particles may increase grain stabilisation of the alloy and improve spark erosion properties. Non-limiting examples of such ceramic oxides are $Y_2O_3$, $ZrO_2$ and rare earth oxides.

In some embodiments, the powder comprises a single type of metal or alloy particle. Alternatively, the powder may comprise more than one type of metal or alloy particle, including mixtures of metal and alloy particles. The exact composition of the metal powder will depend on the desired properties and the skilled person will be able to select a suitable composition.

The composition of the powder may vary through the formation of a single component or attachment. For example, the powder may contain a lower concentration of a given metal or alloy at the start of the process (for example, during step (i) of the process according to the invention) than at a later stage in the process (for example, during the forming of layers in a repeated step (i) in accordance with step (iii) of the process). Conversely, the powder may contain a higher concentration of a given metal or alloy at the start of the process than at a later stage in the process. In this way, the strength of binding of the deposited metal or alloy attachment to the substrate can be increased by a suitable selection of initial metal or alloy for the formation of a strong bond to the surface of the substrate. Additionally, the manufacture of the attachment layers may be more economical using this method because the base portion of the attachment layers of the component can be formed to include a smaller quantity of expensive (for example, PGM) metal or alloy, the concentration of expensive metal being increased towards the tip of the attachment layers of the component where its presence is more technically important in terms of device performance, particularly where the attachment is an electrode suitable for use in a spark plug.

Suitably, the metal or alloy particles within the powder have an average particle size, $D_{50}$, in the range 1 to 200 µm.

Herein, "$D_{50}$" refers to the particle diameter which lies at 50% of the cumulative volume distribution. In other words, 50 vol % of the particles will have a size less than this value and 50 vol % will have a size greater than this value. The skilled person is aware of methods which may be used to determine $D_{50}$. These include sieve analysis, laser diffraction and dynamic light scattering (DLS).

Optionally, nanoscale particles may be used. In this embodiment, the metal or alloy particles within the powder have a $D_{50}$ of at least 10 nm, for example at least 20 nm, at least 30 nm, at least 40 nm, at least 50 nm, at least 100 nm, at least 200 nm, or at least 500 nm.

Alternatively, the metal or alloy particles within the powder have a $D_{50}$ of up to 200 µm, for example up to 150 µm, up to 100 µm, up to 90 µm, up to 80 µm, up to 70 µm, up to 60 µm, up to 50 µm, up to 40 µm, up to 30 µm, up to 20 µm, up to 10 µm, up to 5 µm, up to 2 µm or up to 1 µm.

The skilled person understands that the exact choice of particle size will be dictated by the particular AM process and machine being used. For example, in PBF techniques, $D_{50}$ ranges are commonly 1 to 10 µm or 20 to 60 µm or 40 to 100 µm.

Metal or Alloy Substrate

In the processes, according to the present invention, a component is formed by layers of attachment on a substrate. More especially, the attachment is formed by additive manufacture (AM) and is built up on and fixed to a surface of a metal or alloy substrate.

Suitably, the substrate may be a portion of a central or ground electrode of an ignition device. The attachment then forms the 'tip' of the electrode from which a spark may be generated during use. Preferably, the substrate is a portion of a central electrode of an ignition device.

The substrate may comprise any suitable metal or alloy, or mixture of metals and/or alloys. Suitably, the substrate is a body formed by the co-extrusion of two different metals or alloys or any other method of fabrication known to the skilled person.

The substrate may comprise a metal or alloy different to the metal or alloy which is deposited on the substrate by AM. Alternatively, the substrate does not comprise any metal or alloy which is present in the layers deposited on the substrate. More especially, the substrate optionally does not comprise any PGM.

Additionally, or alternatively, the substrate comprises an electrically conductive metal or alloy.

Preferably, the substrate comprises one or more metals selected from Ag, Au, Cu, Al, Mo, Zn, W, Ni, Fe, Pd, Pt, Sn, Pb, Ti or an alloy of any one of these with one or more elements, for example one or more other metals. More preferably, the substrate comprises one or more metals selected from Cu and Ni or an alloy of any one of these with one or more other elements, for example one or more other metals.

Advantageously, the substrate may comprise a first region comprising a first metal or alloy and a second region comprising a second metal or alloy, different from the first metal or alloy. In this embodiment, the first region may be a core region which is surrounded at least in part by the second region (a shell region). The first and second regions are formed by the co-extrusion of the first and second metals or alloys. In some embodiments, the first region comprises or consists of a conductive metal. In some embodiments, the first region comprises or consists of a transition metal, such as Cu. In some embodiments, the second region comprises or consists of a conductive metal. Alternatively, the second region comprises or consists of an alloy, such as a Ni alloy. Optionally, the second region comprises or consists of Inconel.

More especially, the substrate may comprise a core comprising Cu surrounded at least in part by an external portion comprising Ni or an alloy of Ni.

Suitably, the surface onto which the powder is deposited during AM comprises Ni or an alloy of Ni, and preferably comprises an alloy of Ni. In the alloy of Ni, the primary component may be Ni and the other element(s) in the alloy of Ni may be selected from Cr, Fe, Mo, Nb, Co, Mn, Cu, Al, Ti, Si, C, S, P and B. Preferably, the most abundant element in the alloy is Ni, the second most abundant element in the alloy is Cr and the alloy may comprise one or more other alloyed elements selected from Fe, Mo, Nb, Co, Mn, Cu, Al, Ti, Si, C, S, P and B. Optionally, the alloy is Inconel.

Such "core-shell" type substrates (as described above) for use as part of an ignition device electrode are well-known to the skilled person and commercially available.

The overall shape of the substrate is not particularly limited. The skilled person will be able to select a suitable shape depending on the intended ignition device application.

Suitably, the substrate has an elongate structure. Such substrates have one dimension which is longer than the other two dimensions by a factor of at least 2, for example at least 3, for example at least 4. The cross-sectional geometry of such elongate substrates is not particularly limited but may be selected from circular, elliptical, triangular, square, rectangular, trapezoid, rhombic, pentagonal, hexagonal or octagonal. Such substrates may comprise features on the surface of the substrate, such as ridges, bosses or recesses.

Preferably, the substrate is substantially cylindrical. Central electrodes of ignition devices such as spark plugs are often of cylindrical shape, the 'tip' of the electrode from which a spark is generated being located at one end of the cylinder. As a result, in some embodiments the surface of the cylindrical substrate onto which layers are deposited by AM is one of the end surfaces of the cylinder, which may be substantially planar.

By "substantially cylindrical", we mean that the substrate will generally be of elongate structure with a circular or close to circular cross-section (for example, the cross section may be slightly elliptical in shape rather than a perfect circle). Furthermore, "substantially cylindrical" does not exclude the presence of features on the surface of the substrate, such as ridges, bosses or recesses. The size and shape of the cross section of the substrate may be consistent along its length or may vary, for example such that the substrate has a tapered appearance.

The size of the substrate is also not particularly limited and will depend upon the intended application of the ignition device. As already mentioned, such substrates are commercially available and the process described herein may be adapted to be used with any such substrate. Generally, the substrate may have a length of 0.5 to 80 mm, for example 10 to 20 mm, depending on the design and the intended use.

In the process of the invention, a layer of metal or alloy is initially deposited onto a surface of the metal or alloy substrate. This initial layer may be deposited to cover the entire area of an exposed surface of the substrate. Alternatively, the layer may be deposited to cover only a portion of an exposed surface of the substrate, for example in order to leave a border around the edge of the surface. When the substrate is an elongate substrate, for example a substantially cylindrical as discussed above, the initial layer may be deposited onto one of the end faces of the substrate.

In the sixth embodiment of the invention, the substrate may be an ignition device component, for example an ignition device electrode, for example a spark plug electrode. In other embodiments, the substrate may be any other suitable metal or alloy substrate, for example a lead-out wire of a sensor.

Additive Manufacturing Process

The process according to the invention uses methods of additive manufacturing (AM). AM is a technique whereby 2-dimensional layers of material are sequentially laid down and fused or bound together to form 3-dimensianal solid objects. The technique has been developed for the fabrication of plastic, metal and ceramic components for use in aerospace and medical applications.

The inventors have discovered that AM also offers the possibility to produce ignition device components in an economical way while preserving desirable properties.

The inventors have also discovered that AM offers the possibility to produce noble metal-containing components in an economical way while preserving desirable properties. For example, such processes would find use in the manufacture of sensor attachments, such as lambda sensor attachments, and various other uses where the attachment of a noble metal attachment onto another metal or alloy substrate is required, where such components may otherwise be manufactured using the less economical processes described above, such as laser welding.

The AM method, which is also known as constructive manufacturing, generative manufacturing, direct digital manufacturing, freeform fabrication, solid freeform fabrication or tabbing may be applied to ignition component design using known techniques. In all cases, the AM processes are enabled by conventional 3D design computer packages that allow design of the attachment for the ignition device component as a so-called, "STL file" or "STEP file", which is a simple mesh depiction of the 3D shape. The STL file is dissected using the design software into multiple two-dimensional layers, which are the basis for the fabrication process. The fabrication equipment, reading the two-dimensional pattern, then sequentially deposits layer upon layer of material corresponding to the 2D slices. In powder deposition techniques, in order that the attachment has structural integrity, the powder material is bound or fused together as the layers are deposited. The process of layer deposition and binding or fusion is repeated until a robust attachment is generated. In powder deposition techniques, the unbound or un-fused powder is readily separated from the shaped unit, e.g. by gravity, or blowing.

Preferably, the additive manufacturing method is selected from powder bed fusion, directed energy deposition, and sheet lamination.

In this way, a 3-dimensional object is gradually built up. At the end of the process unfused powder or unwanted metal or alloy material which surrounds the object is removed.

Suitably, after the initial powder layer is deposited into the surface of the substrate, binding or fusing of at least a portion of the layer is performed. Preferably, the binding or fusing is achieved by powder bed fusion (PBF) techniques. According to this technique, after powder deposition either a laser or electron beam is used to melt and fuse the powder together, and to also fuse the initial layer of powder to the substrate. After the first layer has been deposited and fused, subsequent layers of powder are deposited sequentially on top of one another and the powder within the new layer is fused together, and fused to the material in the previous layer. As such, preferably, the process according to the invention is a PBF process. A number of PBF binding and fusion fabrication techniques are available, notably 3D printing and laser melting techniques. Any of the techniques may however be used.

Laser-PBF or electron-PBF are examples of specific PBF techniques which may be used in the present invention.

The details of PBF techniques and the equipment required are well known to the skilled person.

In laser melting, the process comprises three steps in which a thin layer of powder material is initially applied to a base plate using a blade, roller or moving hopper. The thickness of the layer is controlled. Laser radiation is applied as a focussed spot and scanned over the two-dimensional layer to fuse the cross-section of the three-dimensional part, and to fuse the layer to the layers beneath. The laser position is controlled, e.g. using galvanometer mirrors, according to the desired pattern. After the layer is fused, the plate on which the substrate and layer rests is moved downwards by the thickness of one layer and a fresh layer of powder is screened over the fused later. The procedure is repeated thus producing the attachment in three dimensions. After the attachment is formed, the un-fused powder is separated from the attachment simply by gravity or by blowing it away.

Direct laser sintering performs the process at elevated temperature using a solid-state fibre laser. Such systems are commercially available from EOS, Concept Laser or SLM Solutions.

The AM method of the invention may use directed energy deposition (DED) to create the metal or alloy attachment. DED involves a machine with a nozzle mounted on a multi-axis arm. The nozzle is used to deposit melted metal or alloy, either from a wire or powder feed, by melting onto the substrate surface where it cools and solidifies. The process is repeated to build up material layer by layer.

The AM method of the invention may use sheet lamination (SL) to create the metal or alloy attachment. SL involves the layering of multiple sheets of metal or alloy, which are subsequently bound together, for example by ultrasonic welding. CNC machining may then be used to remove the excess material.

In the processes of the invention, a first layer of metal or alloy is deposited on a surface of the substrate, and a second layer of metal or alloy is deposited on a surface of the first layer. This process may be repeated such that an attachment is formed which is made up of two or more fused layers on the substrate, for example at least 5 layers, at least 10 layers, at least 15 layers, at least 20 layers, at least 25 layers, at least 50 layers or at least 100 layers. The layer thickness will be determined by the choice of particle size, but may be for example at least 10 nm, at least 20 nm, at least 30 nm, at least 40 nm, at least 50 nm, at least 100 nm, at least 200 nm, or at least 500 nm.

The layer thickness may be up to 200 µm, for example up to 150 µm, up to 100 µm, up to 90 µm, up to 80 µm, up to 70 µm, up to 60 µm, up to 50 µm, up to 40 µm, up to 30 µm, up to 20 µm, up to 10 µm, up to 5 µm, up to 2 µm or up to 1 µm.

Choosing a greater layer thickness will provide faster formation of an attachment but will lead to a rougher surface of the finished attachment.

The exact number of layers will be determined by the length of attachment required (which in turn will depend upon the desired application) and the maximum particle size used (because the layer thickness will be equal to the particle diameter).

Additionally, or alternatively, the process comprises the production of a plurality of components of ignition devices using an additive manufacturing method, wherein a plurality of substrates is arranged in an array within a single additive manufacturing (AM) unit. More especially, the process may comprise the steps of providing a plurality of substrates arranged in an array within a single AM unit such that each step of the process of the present invention may be performed in relation to each substrate simultaneously or sequentially. As such, the process can be considered to be a batch process, providing two or more components in each "run" of the process.

In this way, using a single AM run it is possible to manufacture a plurality of ignition device components upon a single build plate of the AM unit. This is highly economical in terms of both time and resources. For example, conventionally during a PBF process each layer of powder deposited covers the entire area of the build plate and only a small portion of this is fused to create the 3D object. The remaining unfused powder is removed at the end of the process and re-used in a further run. Thus, in each print run a large amount of powder is deposited but not used to form the product, wasting valuable time and resources.

The skilled person will understand that the term "AM unit" refers to a system which is adapted to perform an AM process. Such systems are known to the skilled person and are commercially available.

By manufacturing a plurality of components, for example at least 2, at least 5, at least 10, at least 15, at least 20, at least 50, at least 100, at least 500 at least 1000, at least 2000 or at least 4000, in a single print run upon a single build plate, the process is made much more efficient.

Suitably, the plurality of substrates may be arranged in a 2-dimensional array on the build plate. In some embodiments, the plurality of substrates is arranged in a regular array, such as a triangular, square or hexagonal array on the build plate.

Preferably, the distance between two adjacent substrates is kept to a minimum. This ensures maximum efficiency of the AM process.

Optionally, the metal or alloy substrate is held upon a build plate during the AM process. The substrate may be held in position within the build plate by any suitable means or may sit within a suitable bore or recess defined by the build plate. The substrate may be held in position within said bore or recess by suitable means, for example by abutment between a protrusion from the surface of the substrate and a protrusion from the inner surface of the bore or recess. The protrusion from the inner surface of the bore or recess may comprise an annular ridge, such that a more stable platform is provided upon which the substrate rests. In this way, not only the axial position of the substrate is controlled but the lateral position of the substrate is also more stable.

Alternatively, the substrate may sit upon the floor of the recess in the build plate. In this way, the axial position of the substrate within the bore or recess can be controlled, for example in order to ensure that the upper surfaces of the substrate and build plate are coplanar.

The processes, as described herein, may therefore comprise, prior to step (i), a step of arranging one or more substrates in position on a build plate.

Optionally, the processes of the invention comprise, prior to step (i), providing a modified build plate comprising a bore or recess suitable for holding the metal or alloy substrate during the AM process, and installing the build plate within an AM unit. The modified build plate may comprise a plurality of bores or recesses into which an equal plurality of substrates may be placed. The modified build plate may comprise a plurality of bores or recesses arranged in an array, such as a triangular, square or hexagonal array.

Generally, the modified build plate may be provided by drilling a conventional build plate in order to provide a suitable recess or bore.

Preferably, the substrate is located within the recess such that the upper surface of the substrate is substantially level with the upper surface of the build plate, or protrudes above the upper surface of the build plate by a clearance of less than or equal to 5 mm. In this way, it can be ensured that, for example, during PBF processes, powder is fused only to the upper surface of the substrate.

When a modified build plate is provided, the process will further comprise a step of inserting one or more substrates into the one or more bores or recesses in the build plate.

Metal or Alloy Attachment

The product of the additive manufacturing process according to one aspect of the invention is a component of an ignition device which is an assembly comprising the metal or alloy substrate and an AM deposited metal or alloy attachment which is fused to the substrate.

The product of the additive manufacturing process according to an alternative aspect of the invention is a noble metal-containing component comprising the metal or alloy substrate and an AM deposited attachment comprising a noble metal or alloy thereof, which is fused to the substrate.

The disclosure above in relation to the properties of the metal or alloy layers and powder also apply to the metal or alloy attachment, which is an object created by fusion of those layers.

Suitably, the attachment has a tapered shape such that its cross-sectional area decreases with distance from the substrate to which it is attached.

Alternatively, the attachment has a convex shape, for example a hemispherical shape or the shape of a spherical cap or dome.

Preferably, the attachment is the sparking tip of an electrode for use in an ignition device. When the attachment is formed from a PGM metal or alloy, this provides particularly desirable properties when the attachment is used as the sparking tip. For example, the attachment has high melting temperature and is less prone to spark erosion, thereby reducing the risk of miss-fire of the ignition device.

The size of the attachment will of course depend on the size of the substrate and the intended application, and the skilled person can adjust the AM method in order to manufacture an attachment of suitable size.

In some embodiments, the attachment has a length of at least 0.1 mm, for example at least 0.2 mm, at least 0.25 mm, at least 0.3 mm, at least 0.35 mm or at least 0.4 mm. In some embodiments, the attachment has a length of up to 10 mm, for example up to 5 mm, up to 4 mm, up to 3 mm, up to 2.5 mm or up to 2 mm.

In some embodiments, the attachment has a width (diameter) of at least 0.3 mm, for example at least 0.4 mm or at least 0.5 mm. In some embodiments, the attachment has a width (diameter) of up to 2.5 mm, for example up to 2 mm or up to 1.5 mm.

Optionally, the processes of the invention further comprise a step (iv) selected from surface finishing and/or mechanical processing of at least a part of the component.

Surface finishing ensures that product standard requirements will be met, where this is not achieved by the AM process alone. In some embodiments, surface finishing is performed by Computer Numerical Control (CNC) machining. In such embodiments, suitable clearance between neighbouring substrates on the build plate must be provided to allow for movement of the CNC tool. In general, the spacing should be at least 3 mm, for example at least 3.5 mm, at least 4 mm or at least 4.5 mm.

Additionally, or alternatively, the surface finishing step may be provided in situ by functionality within the AM machine. In other words, the AM machine may include an automated milling tool which surface finishes the attachments, for example by CNC machining, in situ either simultaneously with the AM process (for example by performing a machining step after each layer has been deposited), or after the attachments have been manufactured.

Optionally, the surface finishing step comprises a 3D scanning process to determine the three-dimensional position of each component on the build plate and to feed this information into the CNC machining system. The accuracy of CNC finishing may depend upon the positioning accuracy of the substrates. So, performing a 3D scan of the substrate positions after printing ensures that the surface finishing process is accurate.

Alternatively, the process may include in-situ melt pool monitoring which will recreate the print in 3D, for example using a system such as the Concept Laser QMmeltpool 3D. The output from the melt pool monitoring may then be used as an input for the CNC finishing process in order to improve accuracy.

Mechanical processing may include any process known to the skilled person for use to change the structure and/or density of AM deposited structures. Non-limiting examples of mechanical processing techniques which may be used in step (iv) include bead peening, mechanical peening, hot or cold rolling or pressing, such as isostatic pressing, for example hot isostatic pressing, or additional AM steps.

Preferably, the mechanical processing comprises a densification process. Densifying is a means to reduce the internal porosity of the AM manufactured part. In this way, a denser attachment can be provided.

In some embodiments, the mechanical processing is used to introduce controlled levels of mechanical work, which can either be left or be utilised in combination with moderate localised heating to create an equiaxed grain structure at the surface, or deeper depending on severity of treatment and the thermal regime employed. In some cases, the equiaxed structure may be created at the joint with the substrate with the epitaxially grown directional grains being confined to the surface of the attachment. Such varied structures are expected to lead to improved stability of the electrode tip in respect of oxidation/corrosion but more significantly thermal and mechanical cycling.

The invention will now be further described with reference to the following non-limiting Figures and Examples. Other embodiments of the invention will occur to those skilled in the art in the light of these.

DETAILED DESCRIPTION

Figure 2:
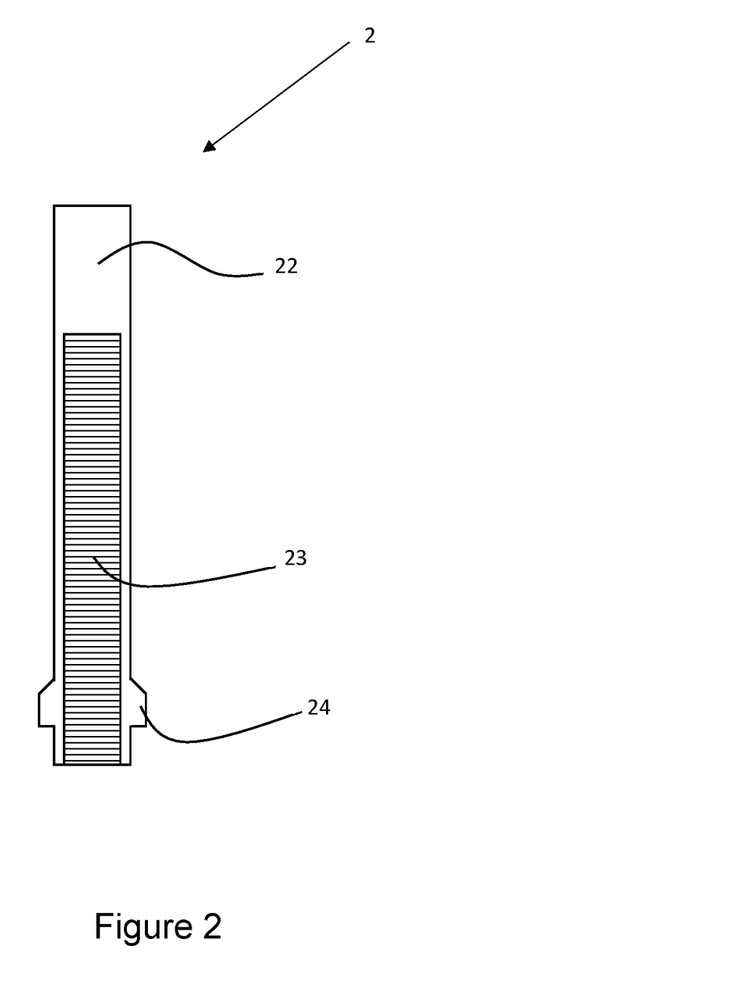
FIG. 2 is a schematic cross-sectional view of a spark plug electrode substrate.

FIG. 2 is a representation of a substrate 2 which may be used to manufacture a spark plug electrode according to the invention.

The substrate 2 is shown in axial cross-section in FIG. 2, and is cylindrical in shape with the exception of an annular protrusion 24 near the base of the substrate. This annular protrusion is present on such substrates as a means to secure the substrate within the ceramic sleeve in which it is held when incorporated into a spark plug. The substrate 2 comprises a composite structure which includes a Ni—Cr (Inconel) outer portion 22 which surrounds a Cu metal core portion 23. Such substrates are commercially available and may be formed by the co-extrusion of the Inconel and Cu materials.

Figure 3:
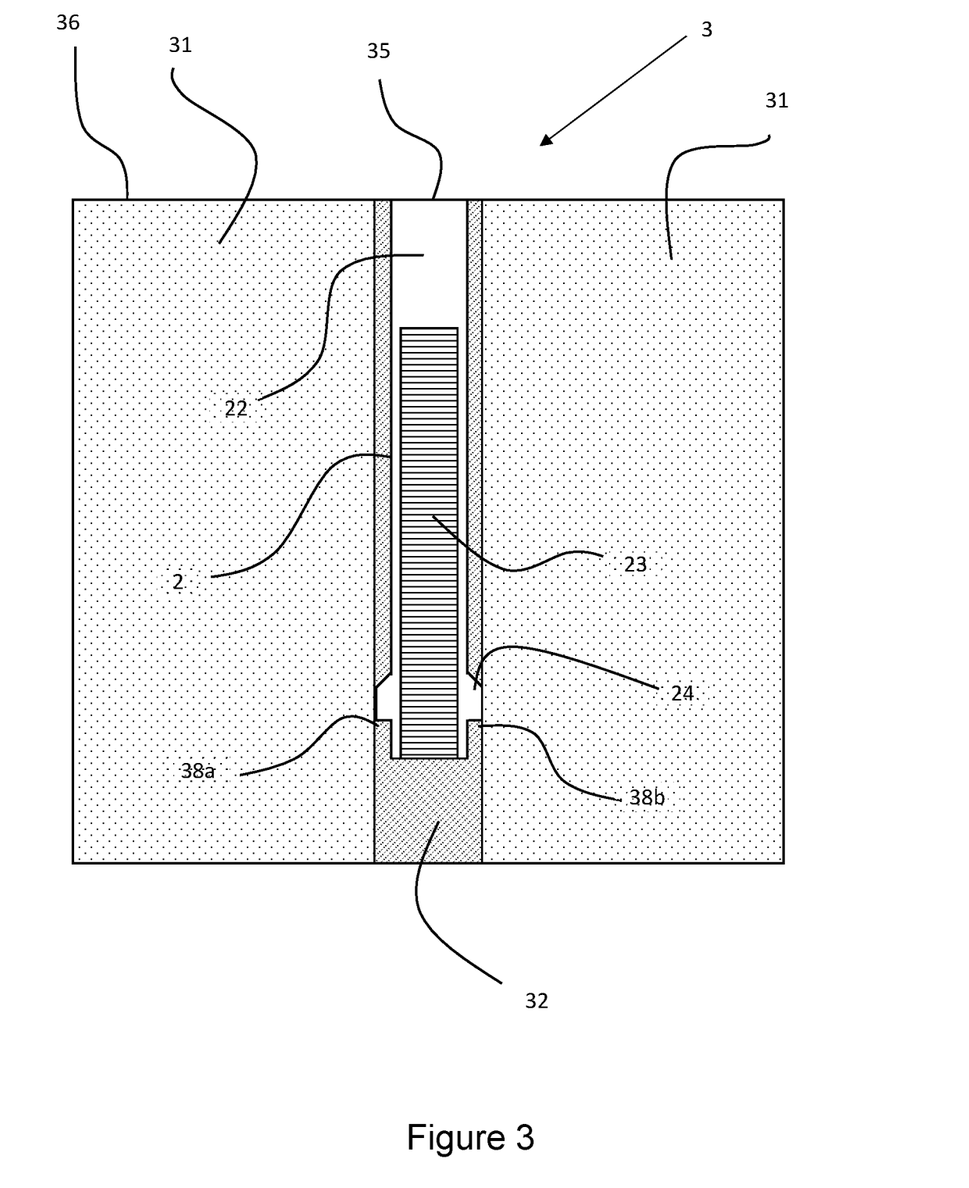
FIG. 3 is a schematic cross-sectional view of a spark plug electrode substrate held within a bore in a build plate.

FIG. 3 is a representation of a substrate 3 identical to that shown in FIG. 2, held in place within a bore 32 defined by a build plate 31, which is part of an Additive Manufacturing machine (not shown). For simplicity, a single bore 32 is shown, although a single build plate may include a plurality of bores as described herein. The diameters of the bore 32 and the protrusion 24 are substantially identical such that the substrate 2 is held in a stable position within the build plate 31. Furthermore, the inner surface of the bore 32 includes an annular ridge 38a, 38b which creates a lip within the bore against which the lower surface of the protrusion 24 abuts. The annular ridge 38a, 38b follows a contour perpendicular with the axis of the bore 32. Further movement of the substrate 2 into the bore 32 is therefore prevented by the abutment of the protrusion 24 against the annular ridge 38a, 38b and the substrate 2 is effectively held in position. The axial position of the annular ridge 38a, 38b within the bore 32 is designed such that the upper surface 35 of the substrate 2 is substantially coplanar with the upper surface 36 of the build plate 31.

Although in this embodiment the annular ridge 38a, 38b within the bore 32 is continuous, alternatively the ridge may be discontinuous, such that it is instead a plurality of protrusions from the inner surface of the bore 32. For example, the annular ridge 38a, 38b may be replaced by two simple protrusions which sit in diametrically opposite positions on either side of the inner surface of the bore 32. However, the annular ridge 38a, 38b is preferred as it provides a more stable platform upon which the protrusion 24 rests, ensuring coplanarity of surfaces 35 and 36.

Figure 4:
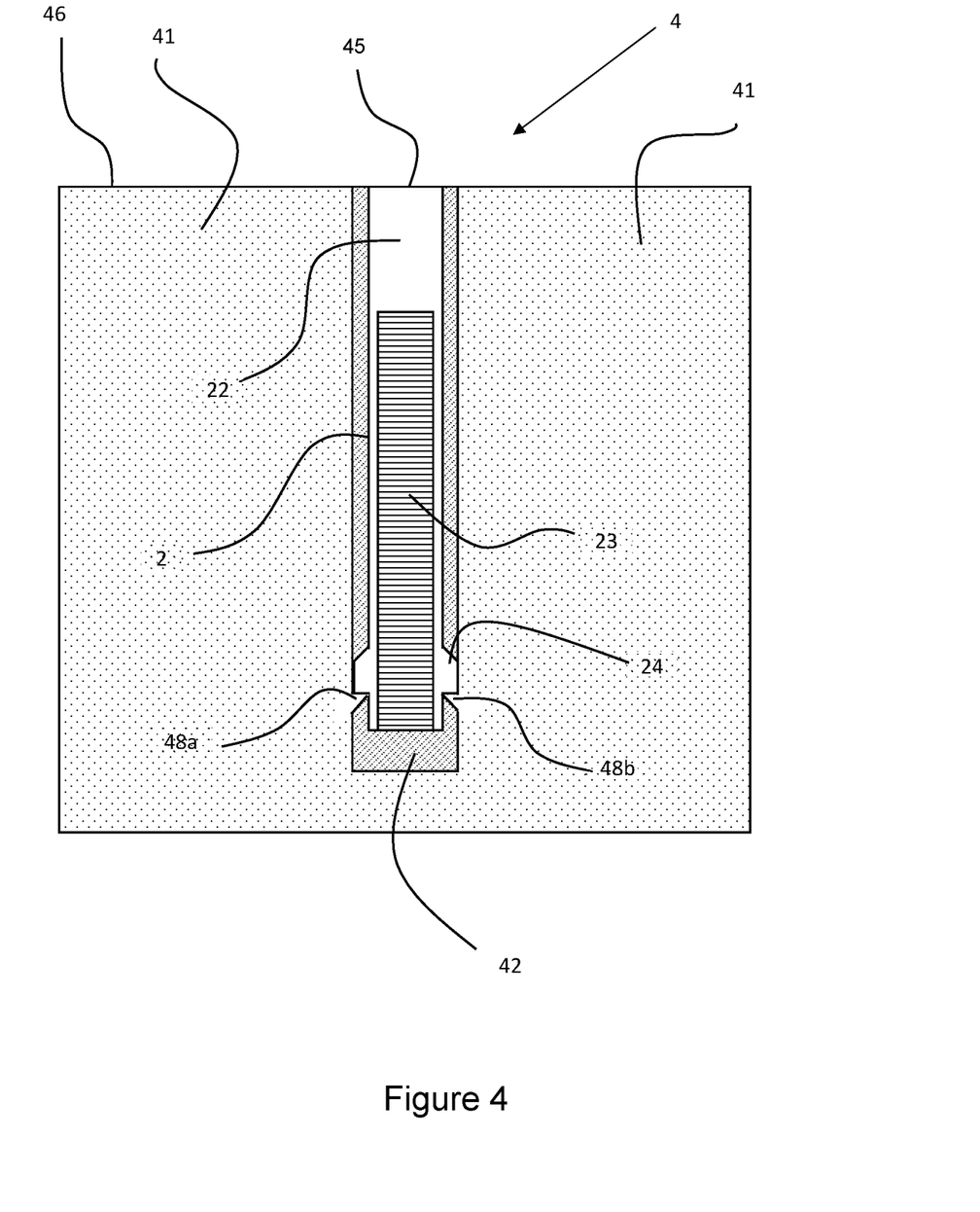
FIG. 4 is a schematic cross-sectional view of a spark plug electrode substrate held within a recess in a build plate.

An alternative embodiment 4 is shown in FIG. 4. The bore 32 of FIG. 3 is replaced with a recess 41 within a modified build plate 41. All aspects of this embodiment are identical to that shown in FIG. 3, except that the recess 41 does not extend through the entire thickness of the build plate 41. Like the embodiment shown in FIG. 3, the position of the substrate 2 is controlled by the presence of an annular ridge 48a, 48b. The axial position of the annular ridge 48a, 48b within the bore 42 is designed such that the upper surface 45 of the substrate 2 is substantially coplanar with the upper surface 46 of the build plate 41.

Figure 5:
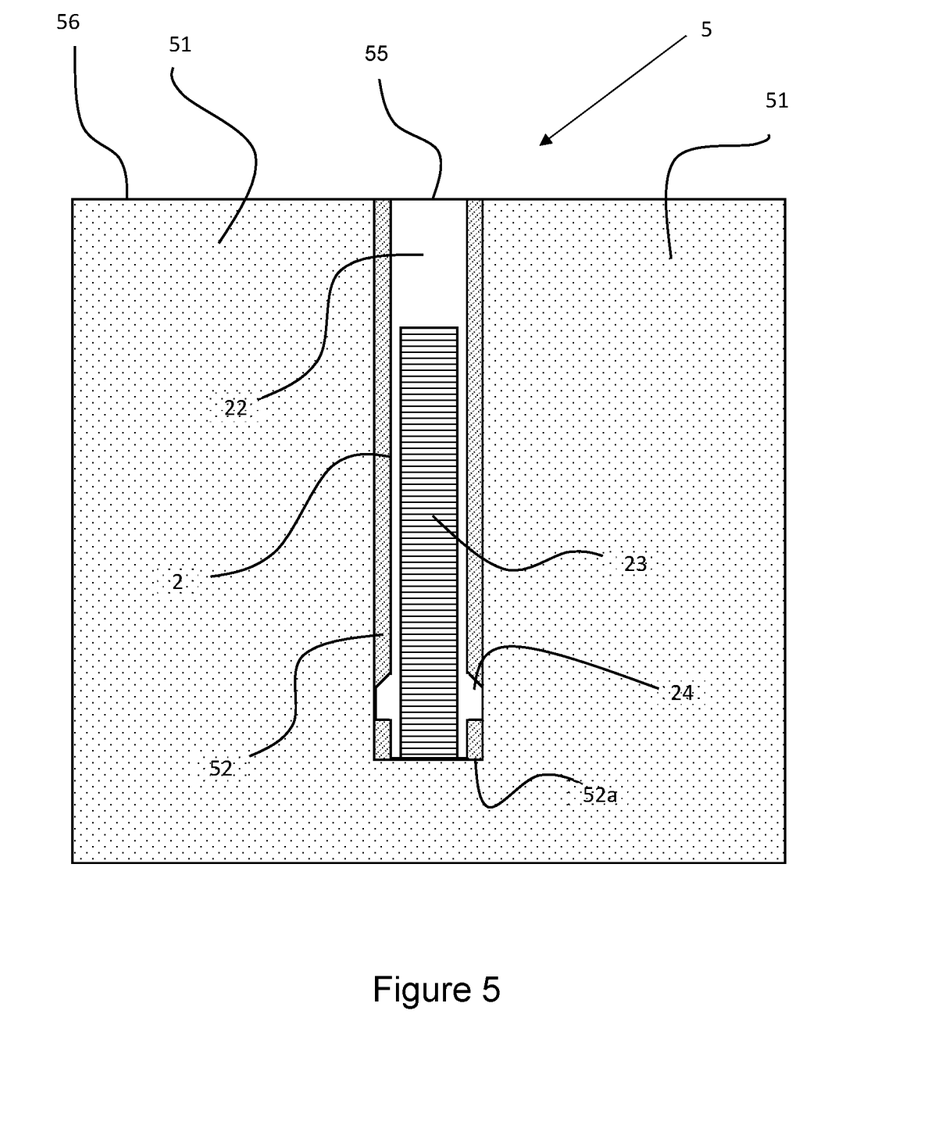
FIG. 5 is a schematic cross-sectional view of a spark plug electrode substrate held within a recess in a build plate.

An alternative embodiment 5 is shown in FIG. 5. The bore 32 of FIG. 3 is replaced with a recess 52 within a modified build plate 51, and the bottom of the substrate 2 rests on the floor 52a of the recess 52. The depth of the recess 52 is designed such that the upper surface 55 of the substrate 2 is substantially coplanar with the upper surface 56 of the build plate 51.

The upper surface 35 of the substrate, which has a circular shape, is coplanar with the upper surface 36, 46, 56 of the build plate. The arrangements shown in FIGS. 3-5 facilitates the deposit of material onto the substrate by AM, and the subsequent formation of an attachment fixed to the upper surface 35 of the substrate 2.

Figure 6:
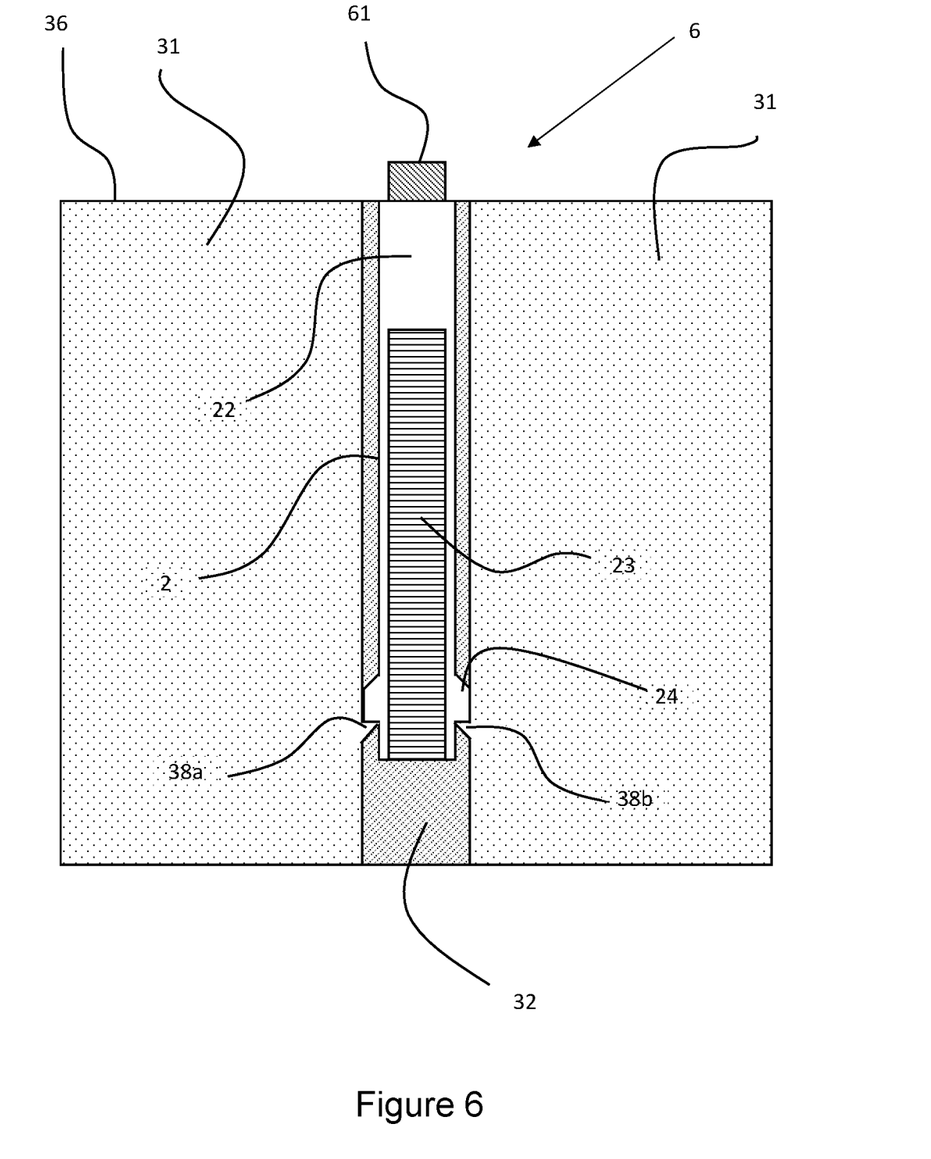
FIG. 6 is a schematic cross-sectional view of a spark plug electrode according to the invention held within a bore in a build plate of an AM machine.

FIG. 6 shows a spark plug electrode 6 according to the invention. A platinum-group metal attachment 61 has been deposited in stages by a powder bed fusion AM process onto the upper surface of the substrate 2. The attachment 61 is fused to the substrate 2. The component 6 is still positioned within the build plate 31, ready for removal.

For simplicity, the AM process itself is not depicted in the Figures. However, referring to FIG. 3, an exemplary PBF process will now be described. A layer of Rh alloy powder is first deposited across the entire surface 36 of the build plate and surface 35 of the substrate in order to form a layer of thickness 30 μm. Some powder inevitably fills the gap between the outside of the substrate and the inner walls of the bore 32. This powder is reclaimed after the process and used again in further print runs. After the first layer has been deposited in this way, an energy beam (for example a laser beam or electron beam) is directed at a portion of the powder layer which lies over the surface 35 of the substrate 2. The irradiated portion is circular and has a slightly smaller diameter than the upper surface of the substrate, such that a small border of the upper surface of the substrate does not become fused to the attachment. The energy beam melts and fuses the metal or alloy powder in the irradiated region together and to the surface of the substrate below. A further layer of powder is then deposited over the entire surface of the first layer. A portion of the second layer which lies over the fused portion of the first layer is irradiated in the same way as the first, to fuse the powder together and to the layer beneath.

This process is repeated a predetermined number of times until an attachment 61 of 4 mm height above the substrate has been formed. Once the PBF process is complete the un-fused powder is removed by blowing and is reclaimed for future use.

Figure 7:
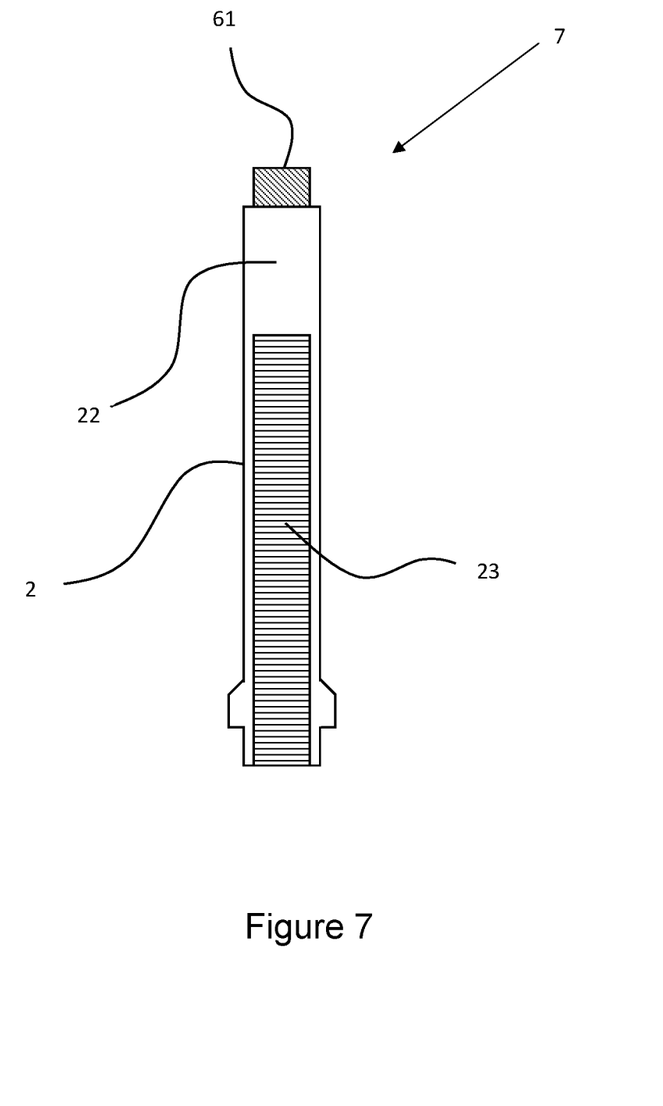
FIG. 7 is a schematic cross-sectional view of a spark plug electrode according to the invention.

FIG. 7 shows a spark plug electrode 7 which has been manufactured by AM deposition of an attachment 61 onto a substrate 2. The electrode can be incorporated into a spark plug to provide the central electrode, the attachment 61 forming the tip from which a spark is generated during use.

The invention claimed is:

1. A process for the production of a tip of a central or ground electrode of a spark plug using an additive manufacturing method, comprising:
   (i$_0$) positioning a central or ground electrode of a spark plug on a build plate;
   (i) forming a layer of metal or alloy on a surface of the central or ground electrode;
   (ii) fusing the layer to the central or ground electrode; and
   (iii) repeating (i) and (ii) layer upon layer to form a deposited metal or alloy attachment representing said tip on the central or ground electrode;
   wherein the metal or alloy deposited onto the central or ground electrode comprises a noble metal or alloy thereof; and,
   wherein no binder is present in the layer forming process.

2. A process according to claim 1, wherein step (i) comprises forming a layer of metal or alloy powder on the surface of the central or ground electrode; and step (ii) comprises binding or fusing at least a portion of the powder in the layer both together and to the central or ground electrode.

3. The process according to claim 1, further comprising the step of (iv) removing the central or ground electrode from the build plate without separating it from the tip.

4. A process according to claim 1, wherein the central or ground electrode comprises nickel or a nickel alloy.

5. A process according to claim 4, wherein the central or ground electrode comprises Inconel alloy.

6. The process according to claim 4, wherein the central or ground electrode comprises nickel or a nickel alloy and a copper core.

7. A process according to claim 1, comprising the production of a plurality of components of ignition devices using an additive manufacturing method, wherein a plurality of central or ground electrodes is arranged in an array within a single additive manufacturing unit.

8. A process according to claim 7, wherein the spacing between central points on adjacent central or ground electrodes is in the range 1 to 10 mm, for example 2 to 8 mm.

9. A process according to claim 1, wherein the central or ground electrode is located within a recess or bore in a build plate of an additive manufacturing unit.

10. A process according to claim 9, wherein the central or ground electrode is held in position within the recess or bore.

11. A process according to claim 10, wherein the central or ground electrode is held in position by means of abutment between a protrusion from the surface of the central or ground electrode and a protrusion from the inner surface of the bore.

12. A process according to claim 9, wherein the central or ground electrode is located within the recess such that the upper surface of the central or ground electrode is substantially level with the upper surface of the build plate, or protrudes above the upper surface of the build plate by a clearance of less than or equal to 5 mm.

13. A process according to claim 1, further comprising a step (iv) selected from surface finishing and/or isostatic pressing of at least a part of the component.

14. A process according to claim 1, wherein step (iii) comprises repeating steps (i) and (ii) at least 5 times.

15. A process according to claim 1, wherein the additive manufacturing method is selected from powder bed fusion, directed energy deposition, and sheet lamination.

16. A central or ground electrode of a spark plug comprising a tip that is produced by the process according to claim 1.

* * * * *